(12) United States Patent
Jones

(10) Patent No.: US 9,329,988 B2
(45) Date of Patent: May 3, 2016

(54) PARALLEL DYNAMIC MEMORY ALLOCATION USING A NESTED HIERARCHICAL HEAP

(75) Inventor: Stephen Jones, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 726 days.

(21) Appl. No.: 13/214,101

(22) Filed: Aug. 19, 2011

(65) Prior Publication Data

US 2013/0046951 A1     Feb. 21, 2013

(51) Int. Cl.
*G06F 12/02*     (2006.01)

(52) U.S. Cl.
CPC .................................. *G06F 12/023* (2013.01)

(58) Field of Classification Search
CPC ........................... G06F 12/023; G06F 12/0269
See application file for complete search history.

(56) References Cited

U.S. PATENT DOCUMENTS

| | | | |
|---|---|---|---|
| 5,561,786 A * | 10/1996 | Morse | 711/170 |
| 6,175,900 B1 * | 1/2001 | Forin | G06F 12/023 707/999.202 |
| 6,209,066 B1 * | 3/2001 | Holzle et al. | 711/153 |
| 2005/0216691 A1 * | 9/2005 | Michael | 711/170 |
| 2005/0268049 A1 * | 12/2005 | De Lange | 711/149 |

* cited by examiner

*Primary Examiner* — Gary W Cygiel
(74) *Attorney, Agent, or Firm* — Artegis Law Group, LLP

(57) ABSTRACT

One embodiment of the present invention sets forth a technique for dynamically allocating memory using a nested hierarchical heap. A lock-free mechanism is used to access to a hierarchical heap data structure for allocating and deallocating memory from the heap. The heap is organized as a series of levels of fixed-size blocks, where all blocks at given level are the same size. At each lower level of the hierarchy, a collection of N blocks in the lower level equals the size of a single block at the level above. When a thread requests an allocation, one or more blocks at only one level are allocated to the thread. When threads are finished using an allocation, each thread deallocates the respective allocated blocks. When all of the blocks for a level have been deallocated, defragmentation is performed at that level.

19 Claims, 10 Drawing Sheets

PARALLEL DYNAMIC MEMORY ALLOCATION USING A NESTED HIERARCHICAL HEAP

BACKGROUND OF THE INVENTION

1. Field of the Invention

The present invention generally relates to dynamic memory allocation and more specifically to parallel dynamic memory allocation using a nested hierarchical heap.

2. Description of the Related Art

The standard C library provides the malloc( ) command, which allocates blocks of memory dynamically from a heap ("the heap" is the term used for the pool of memory available for allocation). Memory blocks may be of any size, and may be allocated and freed repeatedly and in any order. Multiple calls to malloc( ) are guaranteed not to return overlapping memory regions—the memory is "owned" exclusively by the requestor until it is explicitly released through the free( ) command.

Memory allocation poses a problem in parallel programming because of contention arising between multiple consumers (the executing threads) of a single resource (the heap). If two threads access the heap simultaneously and independently, it is possible that both will claim the same region of memory. As the memory region returned by malloc( ) is owned exclusively by the requestor, two threads acquiring the same region would be an error.

A solution of restricting heap access to one thread at a time via a lock results in serialisation of the requests and hence the poorest possible performance. The problem therefore, is to somehow access the heap in a manner which permits parallel execution yet still ensures safe allocation.

Accordingly, what is needed in the art is an improved system and method for allocating memory from a heap for multiple parallel threads so that each thread acquires a separate portion of memory. Importantly, the system and method should also enable defragmentation of the heap when memory is released by the threads so that the memory in the heap does not become divided into small non-contiguous portions over time.

SUMMARY OF THE INVENTION

One embodiment of the present invention sets forth a technique for dynamically allocating memory using a nested hierarchical heap. A lock-free mechanism is used to access a hierarchical heap data structure for allocating and releasing memory from the heap. The heap is organized as a series of levels of fixed-size blocks, where all blocks at given level are the same size. At each lower level of the hierarchy, a collection of N blocks in the lower level equals the size of a single block at the level above. When a thread requests an allocation, one or more blocks at only one level are allocated to the thread. When threads are finished using an allocation, each thread releases the respective allocated blocks. When all of the blocks for a level of the heap hierarchy have been released, defragmentation is performed at that level of the heap hierarchy.

Various embodiments of a method of the invention for allocating memory from a nested hierarchical heap include receiving a memory allocation request specifying an amount of memory and identifying a heap level based on the amount of memory and a block size of one or more heap levels of the nested hierarchical heap. A number of blocks needed to satisfy the memory allocation request is computed and the number of blocks is allocated using an atomic operation. A "lock-free" mechanism allows multiple threads to allocate and release separate portions of memory in parallel. Importantly, allocations and releases are not necessarily serialized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
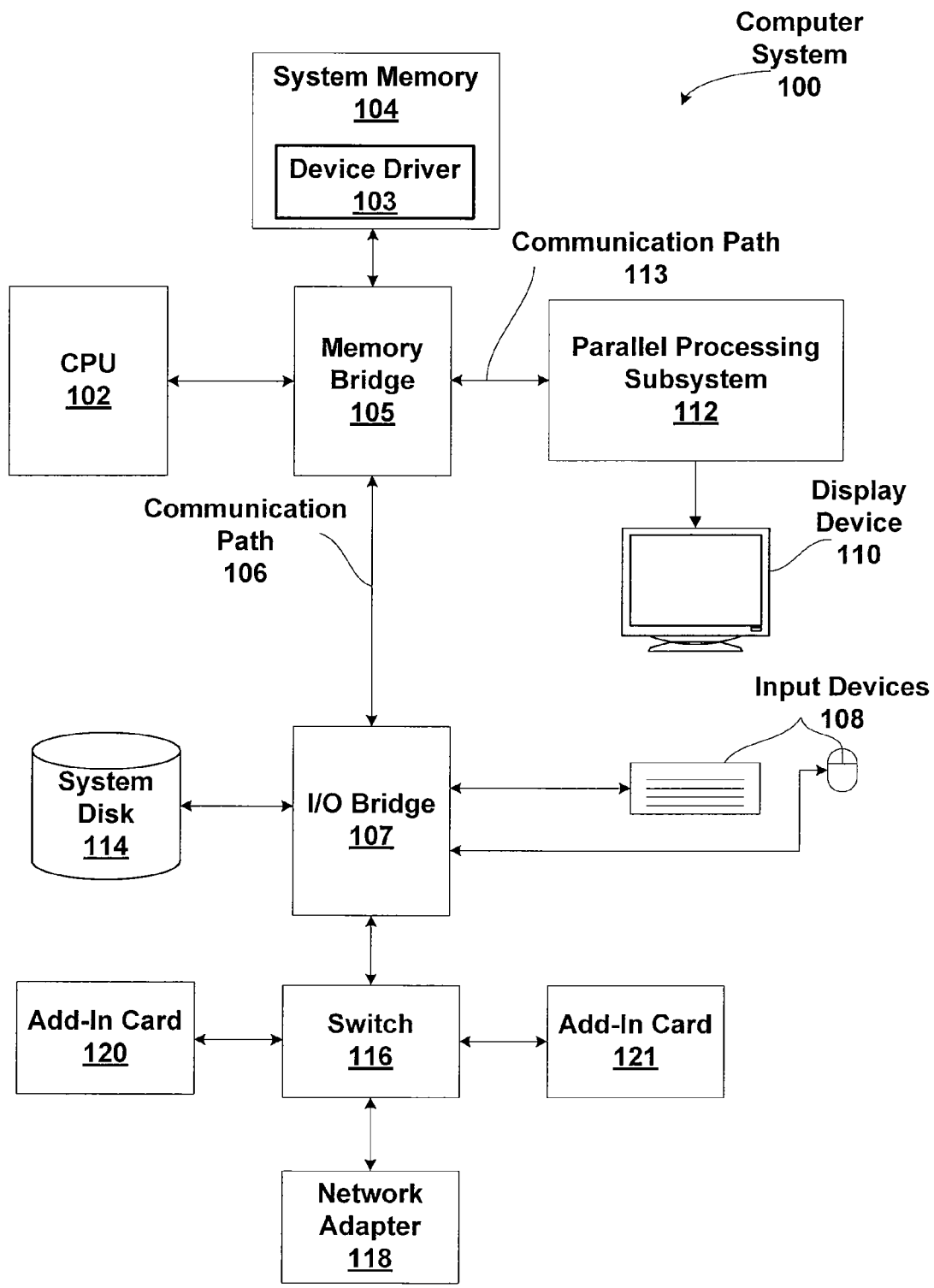
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
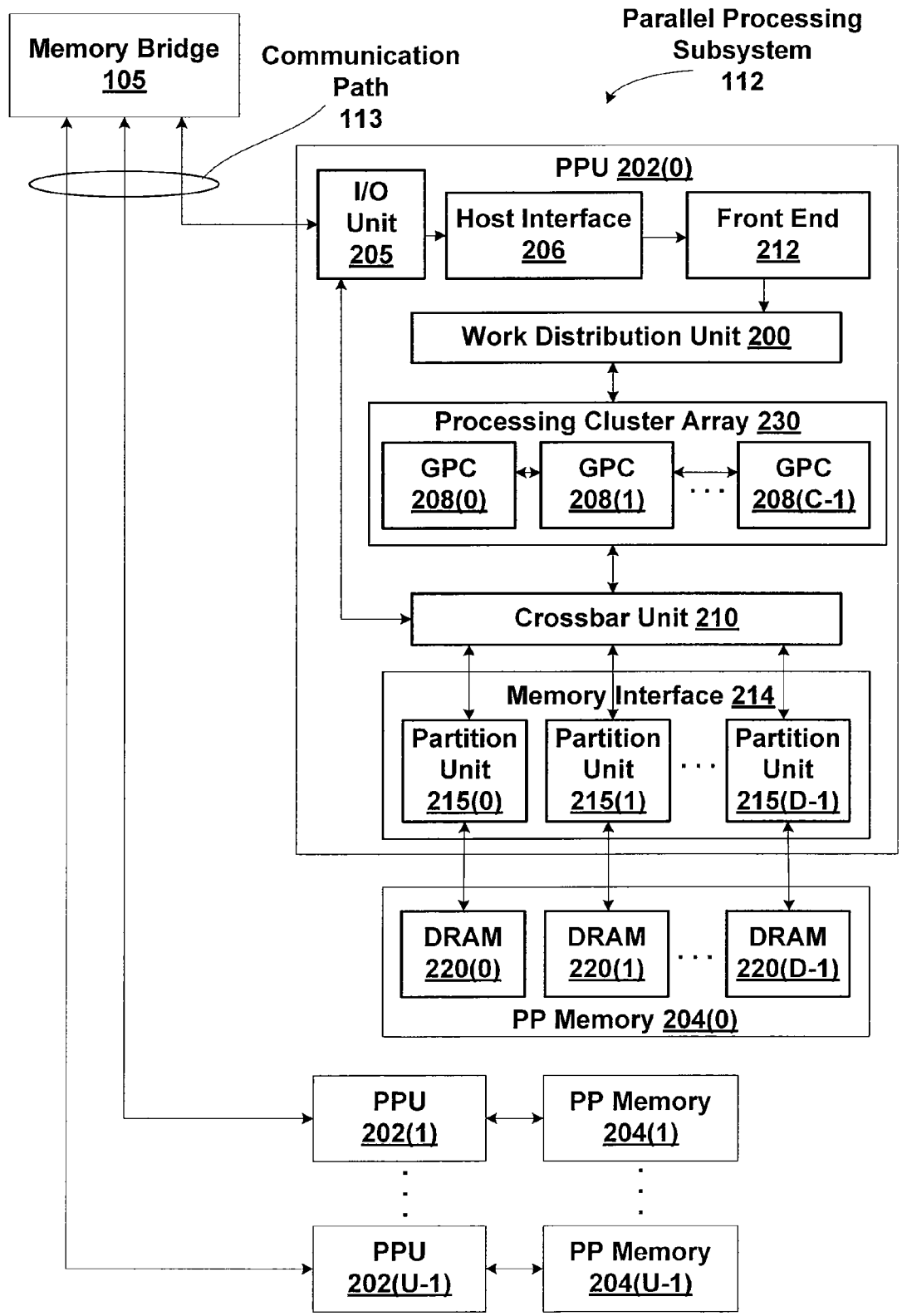
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
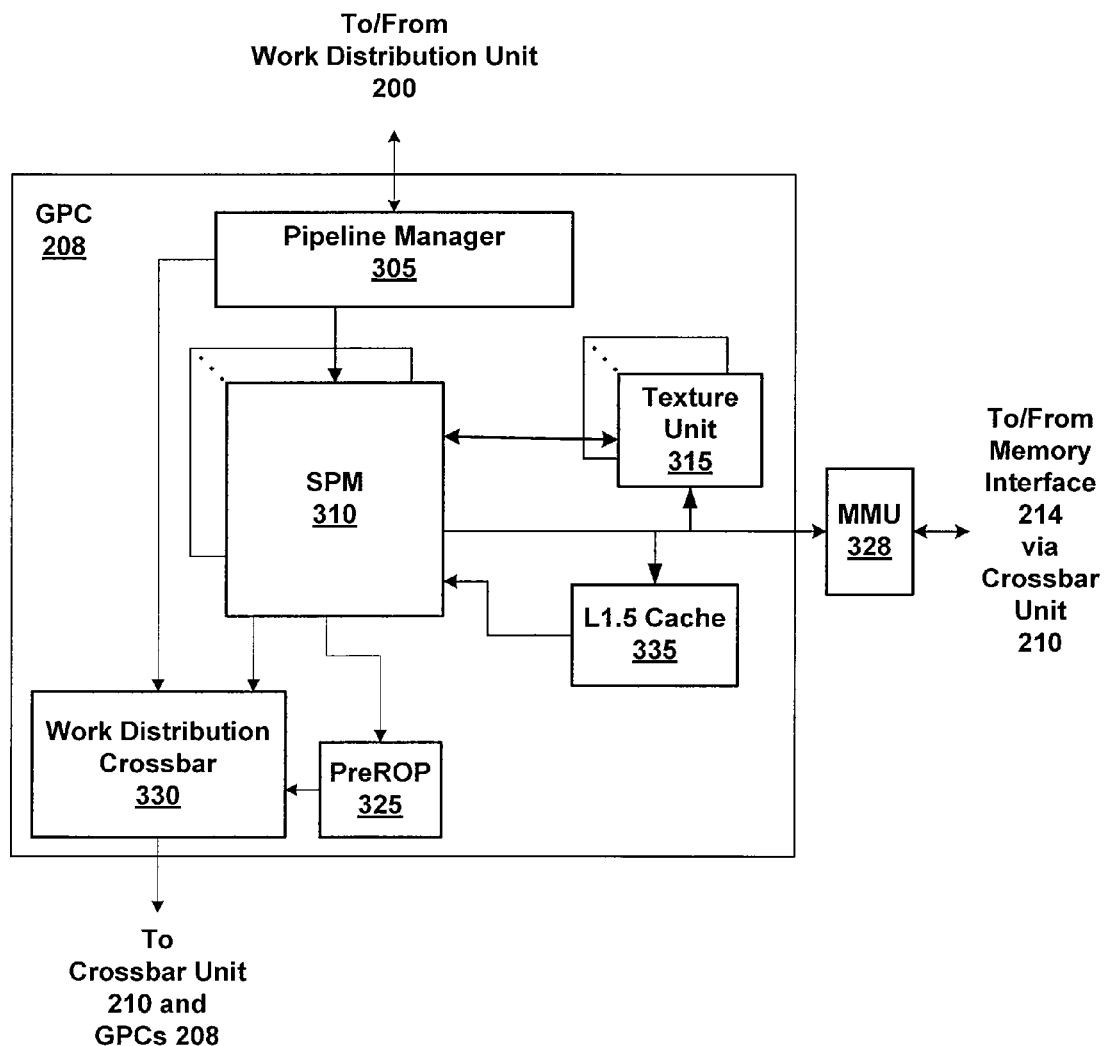
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104.

It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
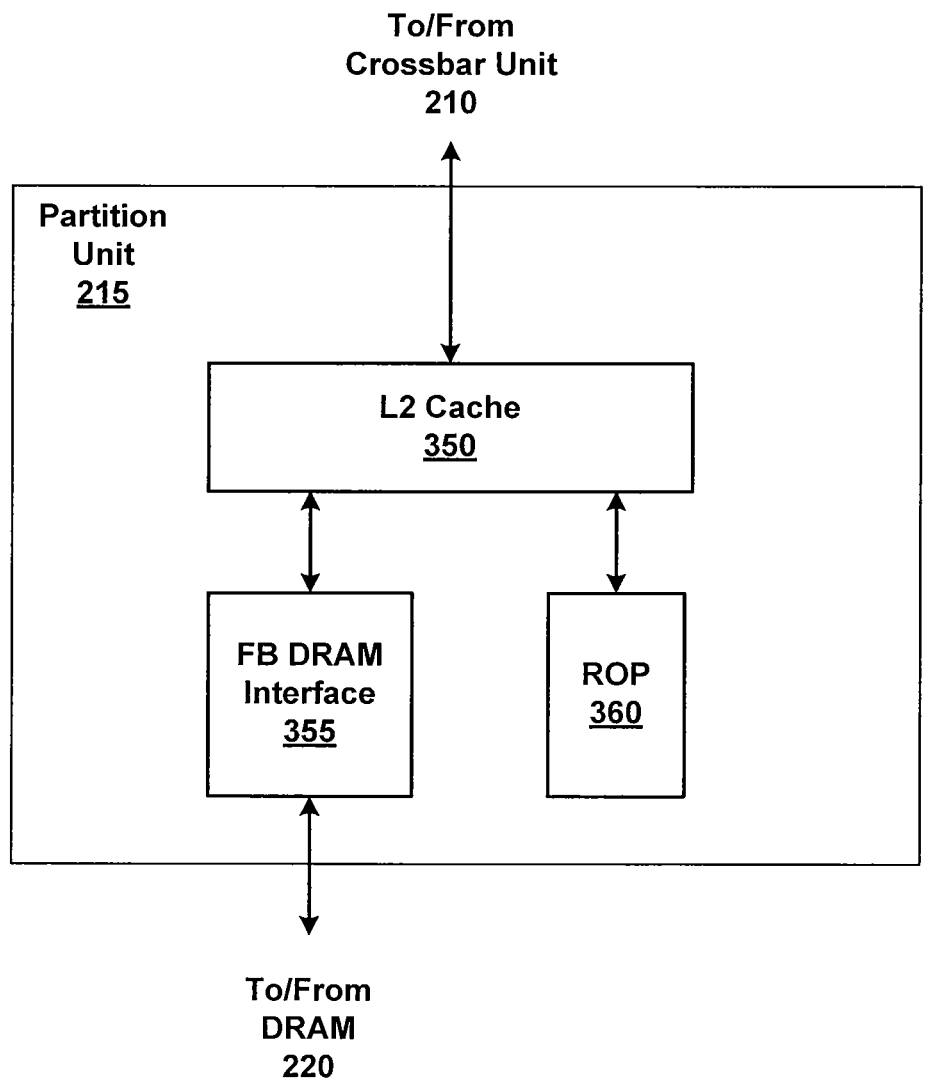
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
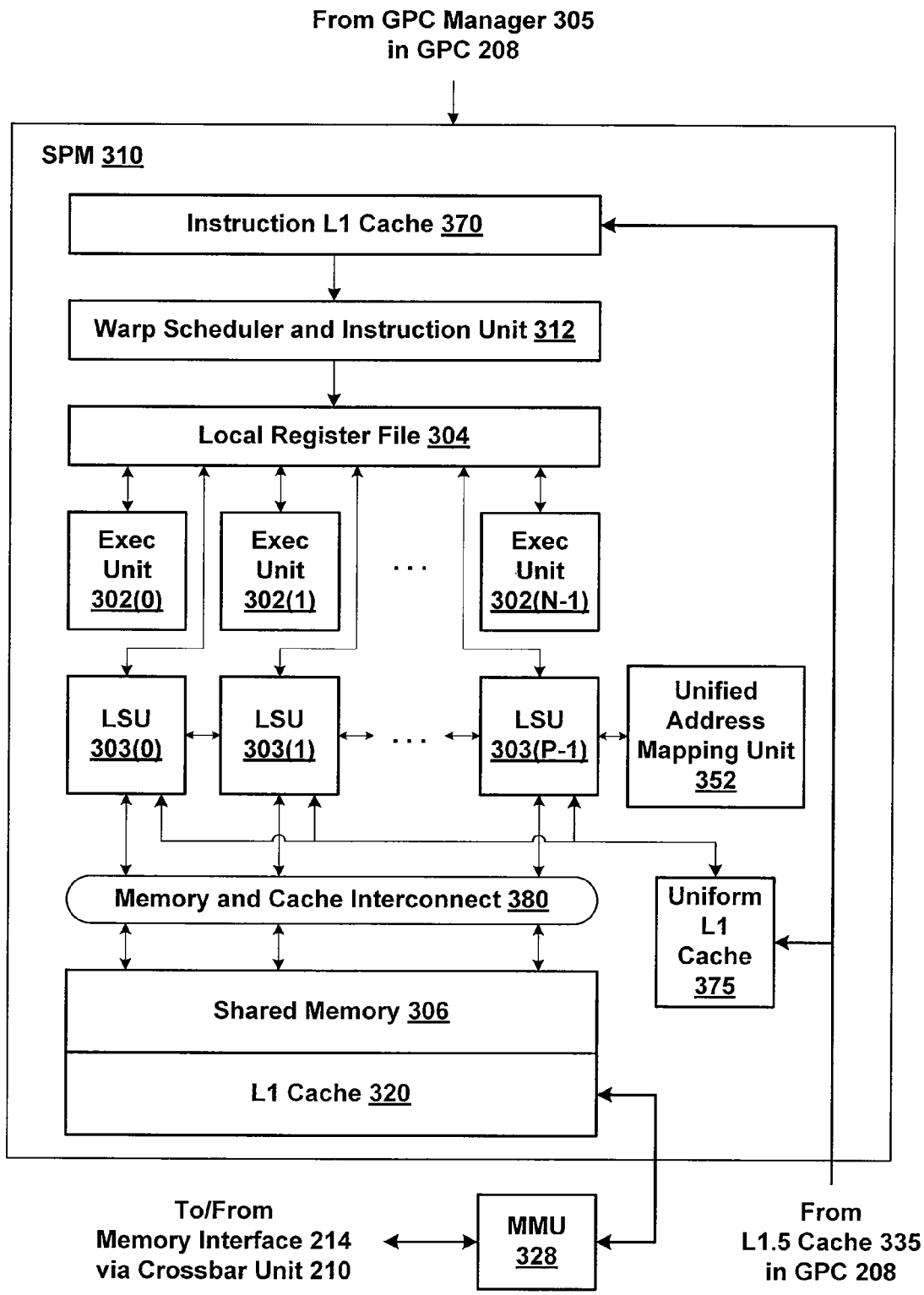
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
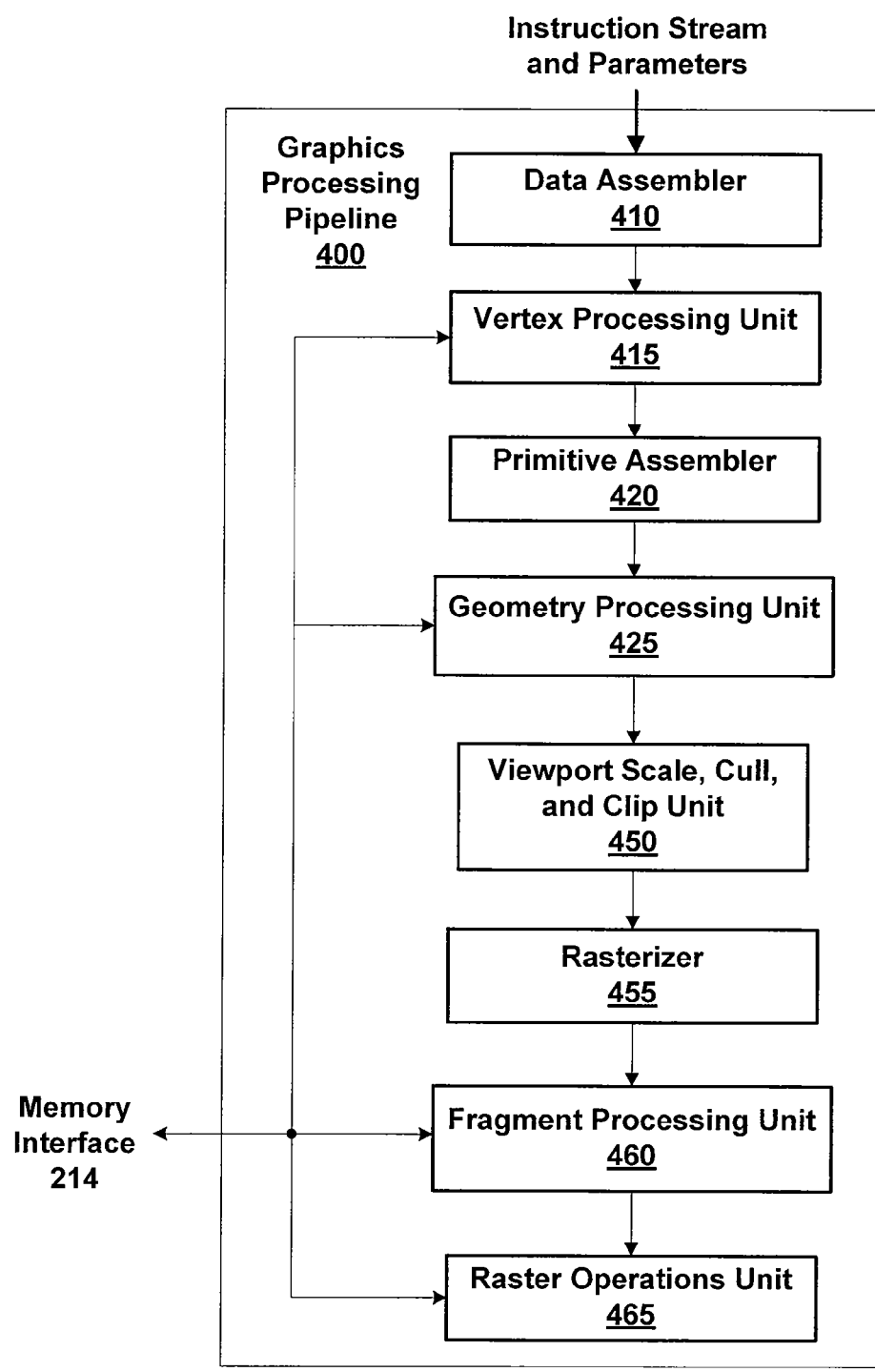
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

A Nested Hierarchical Heap

Memory is organized as a nested hierarchical heap for allocation to one or more parallel threads. Each thread may dynamically allocate a separate portion of the nested hierarchical heap for use during processing. When the thread is finished using the portion of memory, the portion of the nested hierarchical heap is released. A lock-free mechanism is used to allocate and release the portions of memory from the nested hierarchical heap. Lock-based algorithms perform poorly in a parallel system because of serialisation of access to the entire shared resource, e.g. memory. Lock-free algorithms, by contrast, can permit forward progress by multiple threads at once so long as they are accessing different subsections of the shared resource. In other words, multiple threads may allocate memory from the nested hierarchical heap in parallel when those threads access different portions of the nested hierarchical heap.

Figure 5:
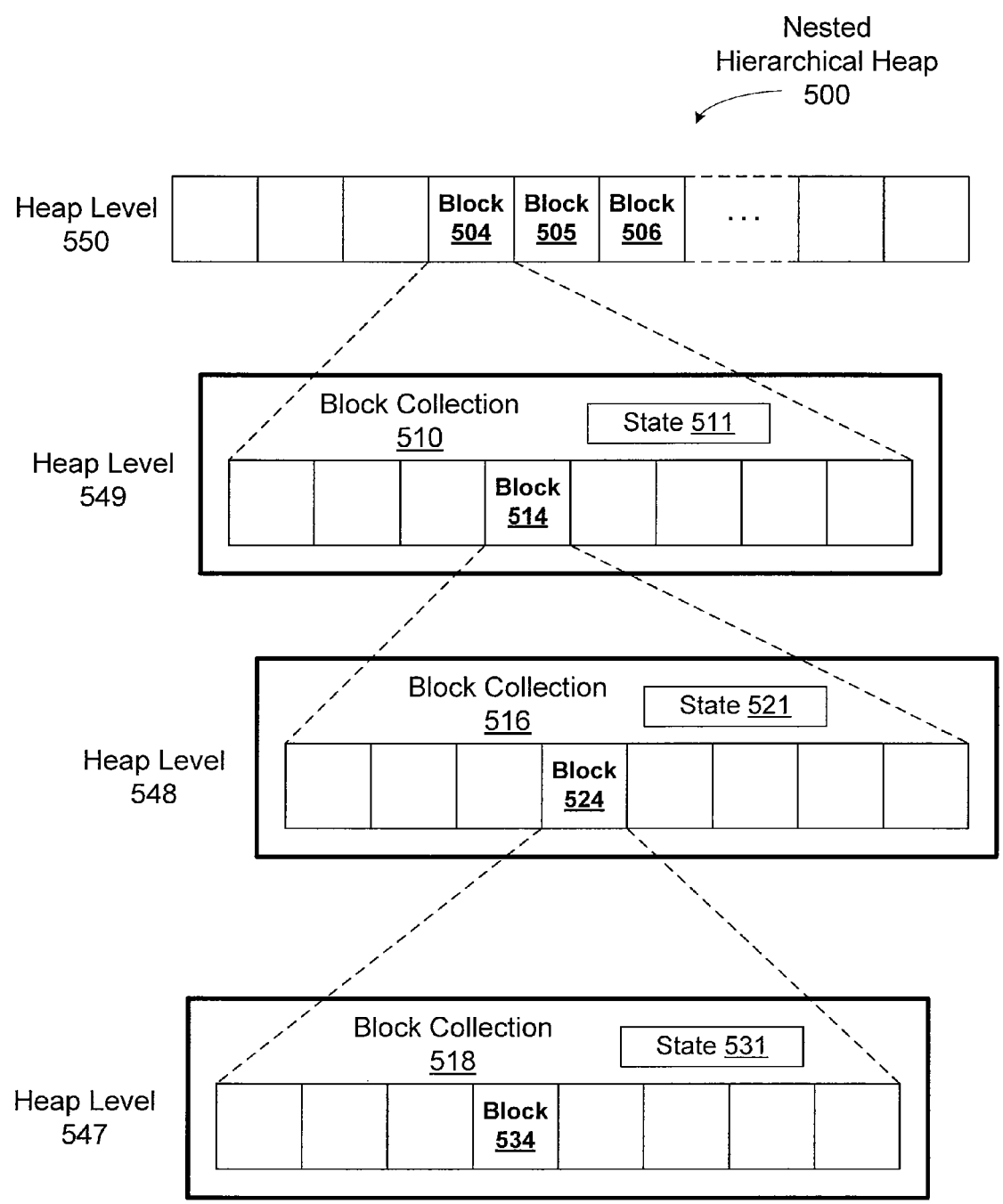
FIG. 5 illustrates the nested hierarchical heap, according to one embodiment of the invention.

The nested hierarchical heap is organized as a series of levels of fixed-size blocks, where all blocks at given level are the same size, as described in conjunction with FIG. 5. At each lower level of the hierarchy, a collection of N blocks in the lower level equals the size of a single block at the immediately higher level. When a thread requests an allocation, one or more blocks at only one level are allocated to the thread. When threads are finished using an allocation, each thread releases its respective allocated blocks. In one embodiment, when all of the blocks in a collection have been released, defragmentation may be performed at that level.

Conventional memory allocation techniques require a thread to first lock access to the heap and then receive an allocation of contiguous memory addresses that is found by searching a tree structure. While one thread has the memory locked, other threads must wait. To avoid locking access to the entire memory, the nested hierarchical heap is structured such that all allocations have a known size at each level, even at the largest level, permitting lock-free parallel access for levels, assuming the number of requested blocks are available at the appropriate level of the nested hierarchical heap. The structure of the nested hierarchical heap allows for parallelism so that multiple threads may simultaneously be allocated a portion of memory or release a portion of the memory from one or more levels or even within the same level.

Subdivision of the nested hierarchical heap into blocks of pre-defined sizes is one way to decrease contention between multiple threads that simultaneously request allocations. A lock-free allocation technique is used by each thread to reserve portions of the nested hierarchical heap to satisfy allocation requests. As allocations are made the amount of memory available in the nested hierarchical heap decreases. The threads may also use a lock-free technique to release portions of the nested hierarchical heap. As is also the case with conventional memory allocation techniques, over time, the nested hierarchical heap may become fragmented, causing difficulties for satisfying allocation requests for large portions of memory because the allocations require contiguous locations in memory. A defragmentation mechanism locks the memory heap for a level of the hierarchy rather than locking the entire nested hierarchical heap, as described in conjunction with FIG. 6C. The lock is also performed in a manner that minimally impacts allocation requests. For example, the defragmentation mechanism may use a defragment flag that is set by a single thread designated to perform the defragmentation operations, similar to how a single thread generates a new block collection by setting a collection generation flag, as described in conjunction with FIG. 6B.

FIG. 5 illustrates the nested hierarchical heap 500, according to one embodiment of the invention. The heap is set up as a series of levels of fixed-size blocks, where all blocks at given level are the same size. As shown in FIG. 5, the nested hierarchical heap 500 includes heap levels 550, 549, 548, and 547. Heap level 550 includes multiple same sized blocks, e.g., blocks 504 and 506. Blocks on the same level are grouped into collections, where the collection is a set of N blocks, and N is any integer. Blocks at the top level of the nested hierarchical heap 500, heap level 550, form a single collection which may be of fewer than N blocks.

A block collection 510 at heap level 549 includes 8 blocks (if N=8). Block collections 514 and 518 at heap levels 548 and 547, respectively, also each include N=8 blocks. Blocks in a collection are contiguous in memory. Each block collection also stores state, e.g., state 511, 521, and 531 that includes information specific to the block collection. The state for a block collection includes an availability map of bits indicating availability of the blocks within the block collection. In one embodiment each block is assigned one bit to indicate availability of that block. The state information also includes a pointer to the next block collection at the same heap level. State information stored for each heap level includes a pointer to the first block collection at the heap level and one or more status bits that are used to lock access to the heap level during block collection generation and defragmentation of the heap level. Each block also stores state that identifies the block collection that includes the block. In one embodiment the state for each block also includes a checksum that is used to determine if the block state data has been corrupted by a program with a memory leak. The block state may also include the number of blocks which make up a single allocation (for the case where an allocation requires multiple contiguous blocks to meet the requested size).

A block collection of N blocks (plus any state) at one heap level of the nested hierarchy perfectly fits into a single block in the heap level immediately higher in the nested hierarchy. For example, the N blocks in block collection 510 at heap level 549, including block 514 and state 511, fit within the single block 504 at heap level 550. Similarly, the N blocks in the block collection 516, including block 524 and state 521, at heap level 548 fit within the single block 514 at heap level 549. The storage available in a block at each heap level is reduced by a factor of N at each level of the hierarchy. For example, assuming that the storage of blocks 504 and 506 is 4096 Kbytes, the storage of block 514 is 512 Kbytes, the storage of block 512 is 64 Kbytes, and the storage of block 534 is 8 Kbytes. To allow for allocation of portions of arbitrary size, multiple blocks from a given heap level may be consumed by a single allocation request. Blocks from different heap levels may not be combined to satisfy a single allocation request. Because an entire block collection fits within a single block at the immediately higher level of the hierarchy, an allocation is satisfied using one or more blocks within a block collection at one heap level. In other words, blocks from two or more block collections need never be combined to satisfy an allocation request.

At the highest heap level of the nested hierarchical heap 500, heap level 550, the blocks are in contiguous memory, e.g., blocks 504, 505, and 506 are contiguous. As blocks are allocated at the heap level 550 other blocks, such as block 504 may be used to generate the block collection 510 at the heap level 549. Block 506 may be allocated at the heap level 550 or at one or more other heap levels below heap level 550. Therefore, while the blocks in each block collection are contiguous in memory, the different block collections at each level of the nested hierarchy are not necessarily contiguous in memory. This presents difficulties when blocks and block collections are released or freed by threads as each block collection must store a pointer to the next block collection for its heap level, i.e., the block collections are stored as a linked list. Traversing the linked list of block collections for a particular heap level to locate additional block collections for the same heap level may jump across memory. Removing a block collection from the linked list for a heap level necessitates modifying the state for one or more remaining block collections to update the linked list. In contrast, a new block collection may easily be added to the linked list of block collections by inserting the new block collection at the beginning or at the end of the linked list.

When a thread requests an allocation of memory from the nested hierarchical heap 500, one or more contiguous blocks at one level are allocated to the thread. Because blocks are all to be allocated from one level, the heap level for the allocation request is determined before blocks are allocated. Determination of which heap level of the heap is required to satisfy an allocation may be made by comparing the size request to the size of a single block at each heap level. Assuming an allocation of 513 Kbytes is requested and the block size of heap level 550 is 4096 Kbytes, the heap level 549 will be identified to satisfy the allocation request since the block size for heap level 549 is 512 Kbytes which is less than the requested allocation size. The heap level 548 would equivalently be identified to satisfy an allocation request for 511 Kbytes.

Once the heap level is identified, the number of blocks needed to satisfy the request is computed. Note that all allocations must comprise an integer number of blocks; therefore, if the actual desired size is not an exact multiple of the block size, some over-allocation waste will occur. If an allocation requires more contiguous blocks than are available at the identified heap level, a new block collection is generated for that heap level by claiming just one single block from the immediately higher heap level. The blocks needed to satisfy the allocation request are marked as "used" in the new block collection. If, similarly, the heap level above has no available blocks then a single block from the immediately higher heap layer that may be claimed, and so on.

Multiple block collections may exist at any heap level. As previously explained, the block collections at each heap level may be linked together in a list, such that a memory allocator can search through all of block collections in order to find the set of contiguous blocks needed to satisfy the allocation request before deciding to generate a new block collection. As all blocks within a block collection come from a single block at the heap layer above, the blocks within the same collection are guaranteed to be contiguous in memory. This in turn means that an allocation request for a chunk of memory larger than fits into one block may be satisfied by grouping together multiple contiguous blocks within a block collection.

When a new block collection is generated, the block collection is added to the list at the appropriate heap level. The state of each block in the new block collection is updated to point to the parent block from which the new blocks were generated. The parent block at the higher level in the nested hierarchical heap 500 "contains" the new block collection. In one embodiment, the new block collection is inserted at the front of the list for the identified heap level, so that available blocks are quickly found for new allocation requests.

In order to allow multiple threads to allocate memory in parallel without serialising access to the nested hierarchical heap 500 by locking the nested hierarchical heap 500 for each allocation, atomic bitwise- and compare-and-swap (CAS) operations are performed for lock-free access. Using atomic operations ensures that read-modify-write operations performed by a thread do not conflict with those performed by any other thread at the same time. An allocating thread (memory allocator) performs lock-free allocation of memory using atomic CAS operations on the availability map of each block collection state at the identified heap level. The reliance on atomic operations imposes an upper-bound for the value of N. Specifically, N, the number of blocks in a block collection, can be any number so long as it is no larger than the maximum number of bits which may manipulated atomically by the hardware.

At the topmost level of the nested hierarchical heap 500, the entire heap is divided into one single collection of <=N blocks of the largest size. The requisite size of the topmost block at the heap level 550 can be derived iteratively from the desired size of the smallest block (selected to minimise over-allocation waste). The size of a single block at a given level, L, is given by:

$$S_L = A \sum_{k=0}^{L} N^k + N^L(B + S_0)$$

Where:
L=identified heap level, L>=1
N=number of blocks in a block collection
A=per-collection state (in bytes)
B=per-block state (in bytes)
$S_0$=size of smallest block
$S_L$=size (in bytes) of block at level "L"

The above equation constrains the block size at all heap levels to be a function of the collection size, N, and the minimum block size, $S_0$. The size of the nested hierarchical heap 500 Is not necessarily an integer multiple of the largest block size. Thus, as the block size is fixed for each heap level, any remainder may be unused and wasted. Because block sizes increase by a factor of N at each level of the nested hierarchical heap 500, the potential waste at the topmost level (heap level 550) may be large. Creating initial block collections with fewer than N blocks at one or more heap levels below the topmost heap level may minimize the space that is wasted.

Figure 6A:
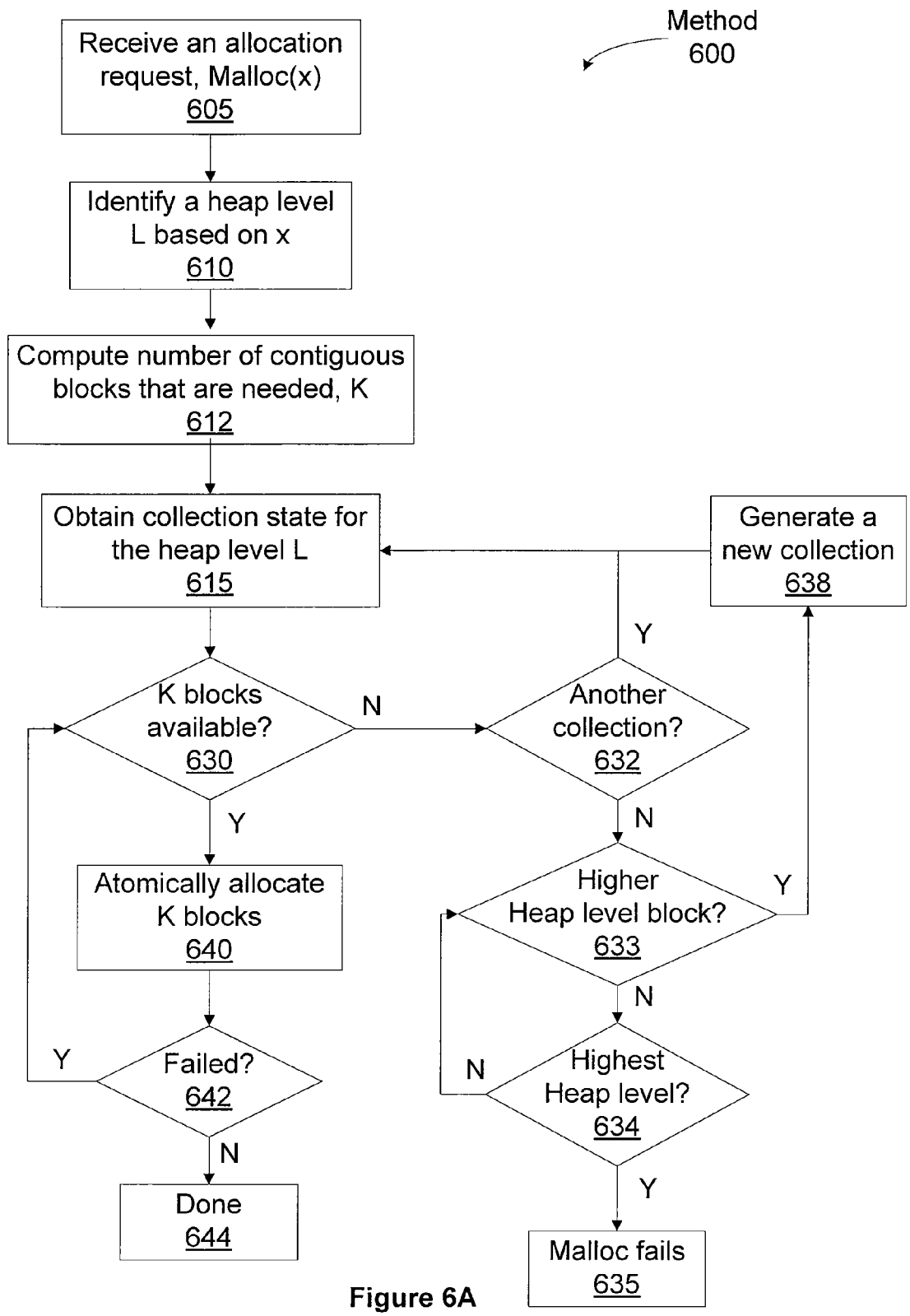
FIG. 6A is a flow diagram of method steps for allocating memory from the nested hierarchical heap for a thread, according to one embodiment of the present invention.

FIG. 6A is a flow diagram of method steps for allocating memory from the nested hierarchical heap for a thread, according to one embodiment of the present invention. Although the method steps are described in conjunction with the systems of FIGS. 1, 2, 3A, 3B, 3C, and 4, persons skilled in the art will understand that any system configured to perform the method steps, in any order, is within the scope of the invention.

The method steps shown in FIG. 6A are performed by each one of the parallel threads to allocate memory from the nested hierarchical heap 500. At step 605 an allocation request for a portion of memory is received from a thread, e.g., Malloc(x), where x is the amount of memory requested. At step 610 a memory allocator (i.e., the requesting thread) identifies a heap level L based on the amount of memory requested. At step 612 the memory allocator computes the number (K) of contiguous blocks that are needed to satisfy the allocation request based on x and the size of blocks at heap level L, $S_L$.

At step 615 the memory allocator obtains the block collection state for a first block collection the identified heap level L. The state for the heap level L includes a pointer to the first block collection. Subsequent block collections at the heap level L are found by following a pointer to the next block collection stored in the block collection state for the preceding block collection for the heap level L. Alternatively, an ordered list of the block collections is maintained in the state for the heap level L.

The block collection state for each block collection includes an availability map indicating block availability. Each block in the block collection is assigned one bit in this bitmap (for example a bit set to a value of 1 indicates that the corresponding block is available for allocation; a bit set to 0 indicates that it is already in use). At step 630 the memory allocator determines if K contiguous blocks are available in a single block collection at heap level L, and, if so, at step 640 the memory allocator atomically allocates the K blocks to indicate the blocks that are no longer available for allocation in the single block collection, e.g., by simultaneously setting the bits in the availability map corresponding to the allocated blocks to 0. As multiple threads may be attempting to allocate memory at the same time, updating the state must be performed atomically using a single CAS operation. The CAS operation fails if another thread has updated the bits of the availability map to allocate one or more of the blocks. To reduce the likelihood of different threads attempting to allocate one or more of the same blocks, threads may use indexes or offsets to access different portions of the list of block collections for each heap level. The threadID may be used as an index.

If, at step 642 the memory allocator determines that the CAS operation failed, then the memory allocator returns to step 630 to repeat the search for K blocks and find another set of K blocks within the same block collection. If, at step 642 the memory allocator determines that the CAS operation did not fail, then at step 644 the memory allocation request succeeded and is done.

If, at step 630 K blocks are not available within a single block collection at the heap level L, then at step 632 the memory allocator determines if another block collection exists at the heap level L. When another block collection exists at the heap level L, the memory allocator returns to step 615 to obtain the state for that block collection. In the event that no block collection exists at the heap level L, the memory allocator will also reach step 632. At step 632, when another (or no) block collection exists at the heap level L, at step 633 the memory allocator determines if a block is available at the immediately higher heap level, L+1, and, if so, a new block collection is generated for the heap level L using a single block from heap level L+1. The details of step 638 are described in conjunction with FIG. 6B.

If, at step 633 the memory allocator determines that a block is not available at the next higher heap level, then at step 634 the memory allocator determines if the next higher heap level is the highest heap level, and, if so, then at step 635 the Malloc request fails. The nested hierarchical heap 500 is typically stored in physical memory and is therefore limited in size. Otherwise, if there is a nest higher heap level, the memory allocator returns to step 633 to find an available block at a higher level of the nested hierarchical heap 500 that can be used to generate a block collection at heap levels L+1 and then at heap level L. In sum, when K contiguous blocks are not available at heap level L, the memory allocator searches the higher levels until an unused block is found and then generates a new block collection at each level that was searched.

Figure 6B:
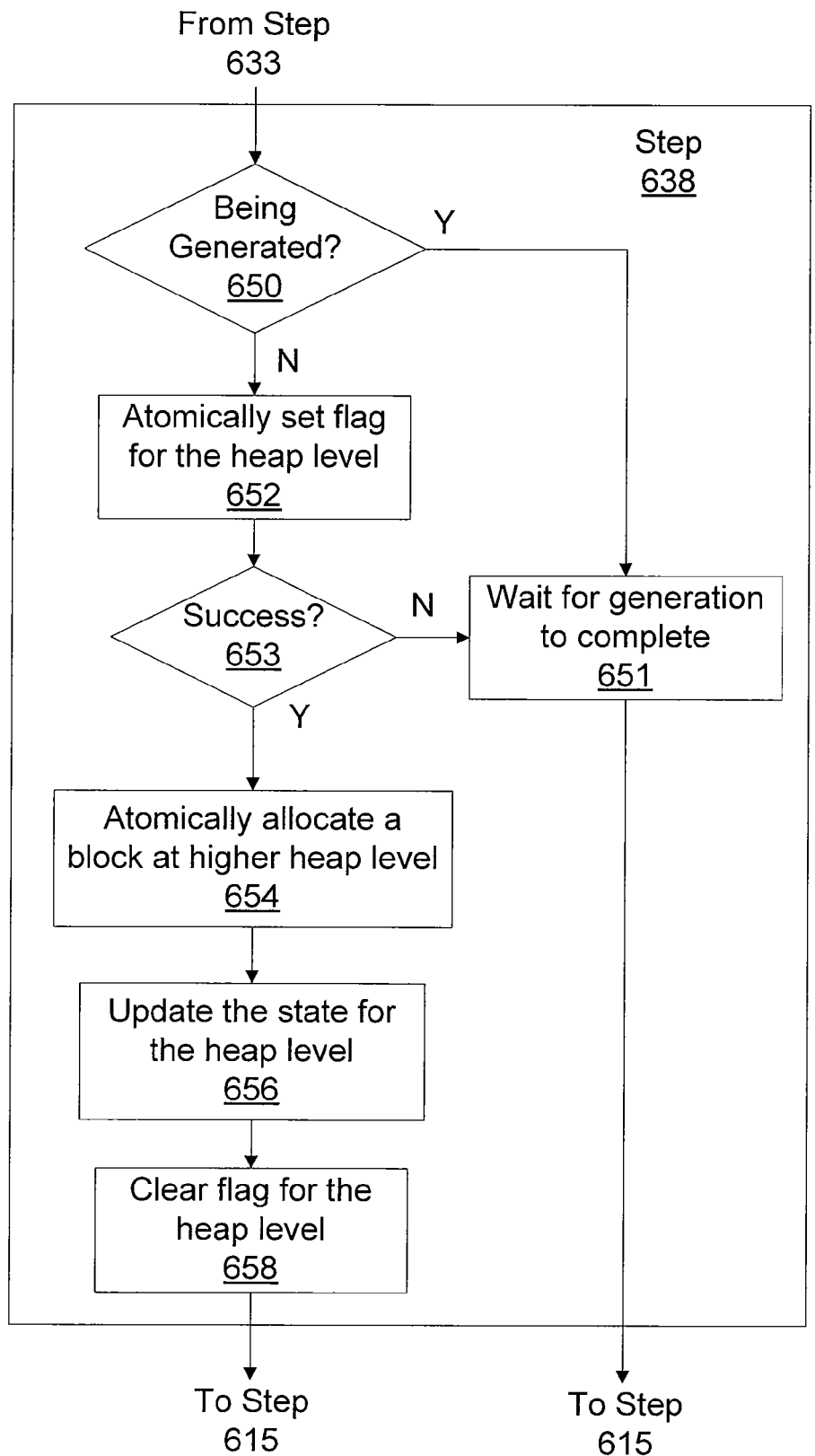
FIG. 6B is a flow diagram of method steps for one of the steps shown in FIG. 6A, according to one embodiment of the present invention.

FIG. 6B is a flow diagram of method steps for step 638 shown in FIG. 6A, according to one embodiment of the present invention. At step 650 the memory allocator determines if a block collection at the heap level (L, L+1, or higher) is already being generated because another thread has requested a memory allocation for the heap level. Rather than have each thread independently generate a block collection, one thread is designated to generate one or more block collections. Any other threads requesting a memory allocation that exceeds the number of available blocks at a level will wait until the new block collection(s) is generated. While the wait is undesired, any thread that is waiting would incur a similar delay to generate a new block collection itself.

If, at step 650 the memory allocator determines that one or more block collections are in the process of being generated, then at step 651 the memory allocator for that thread waits while the one or more block collections are generated by a different thread and then returns to step 615. If, at step 650 the memory allocator determines that additional block collections are not being generated, then at step 652 the memory allocator atomically sets a collection generation flag for the heap level, L or higher, at which new block collection(s) are being generated. When the collection generation flag is set for a heap level, at least one new block collection is being generated. The setting of the collection generation flag needs to be an atomic operation because more than one thread may simultaneously attempt to generate a new block collection as multiple threads perform the method 600 for allocating memory from the nested hierarchical heap.

At step 653, the memory allocator determines if the collection generation flag was successfully set by the thread, and, if not, a different thread set the collection generation flag to generate a new block collection. At step 651 the thread waits for the different thread to complete generation of the new block collection before proceeding to step 615. If at step 653, the memory allocator determines that the collection generation flag was successfully set by the thread, then at step 654 the memory allocator allocates a block at the higher heap level, marking the block as allocated (not available) in the state for a block collection. At step 656 the memory allocator updates the state for the heap level, L or higher, at which the new block collection is created. For example, a pointer to the new block collection(s) may be inserted at the front of a list of block collections for the heap level. At step 658 the memory allocator clears the block collection generation flag for the heap level, L or higher, indicating that generation of the one or more new block collections is complete, and then returns to step 615. Clearing this flag releases any other threads which are waiting in step 651 for new block generation to complete; then those waiting threads also return to step 615.

When a program no longer requires the use of a memory allocation, the memory allocation may be released using a free( ) command. In one embodiment a different thread than the thread that acquired a particular memory allocation may release the particular memory allocation. When a memory allocation is released, all blocks acquired for the allocation are marked as available. Specifically, the availability map in the block collection state for the block collection that includes the released blocks is set to indicate that the blocks are available. As is the case for memory allocation requests, multiple threads may be accessing the state for one or more block collections at the same time, therefore an atomic operation is required to perform the release. To perform a release of one or more blocks, either a CAS or a simpler atomic bitwise OR (when 0=allocated and 1=available) or AND (when 1=allocated and 0=available) may be used.

If, upon release, all blocks in the block collection including the released blocks are then available, the block collection itself can be released. However, releasing a block collection so that the parent block at the immediately higher heap level becomes available is difficult because the block collection needs to be removed from the list of block collections for the heap level and multiple threads may be simultaneously attempting to receive memory allocations or release memory allocations. However, it is desirable to release the parent blocks when a block collection is freed to minimize fragmentation of the nested hierarchical heap 500.

Several different mechanisms may be used to release block collections and parent blocks. In one embodiment, a defragment flag is used to lock a heap level while a memory deallocator updates the block collection list for the heap level and releases parent blocks at the immediately higher heap level. Once the defragmentation of the heap level is complete, the defragment flag may be cleared, allowing allocations and releases to be performed for the heap level. The defragment operation may be performed: when a malloc operation fails; or periodically; or when the number of released block collections is higher than a predetermined threshold; or when a thread releases the last block at the heap level, freeing the last block collection at the heap level. In one embodiment, the defragment flag is also used as the block collection generation flag.

Figure 7:
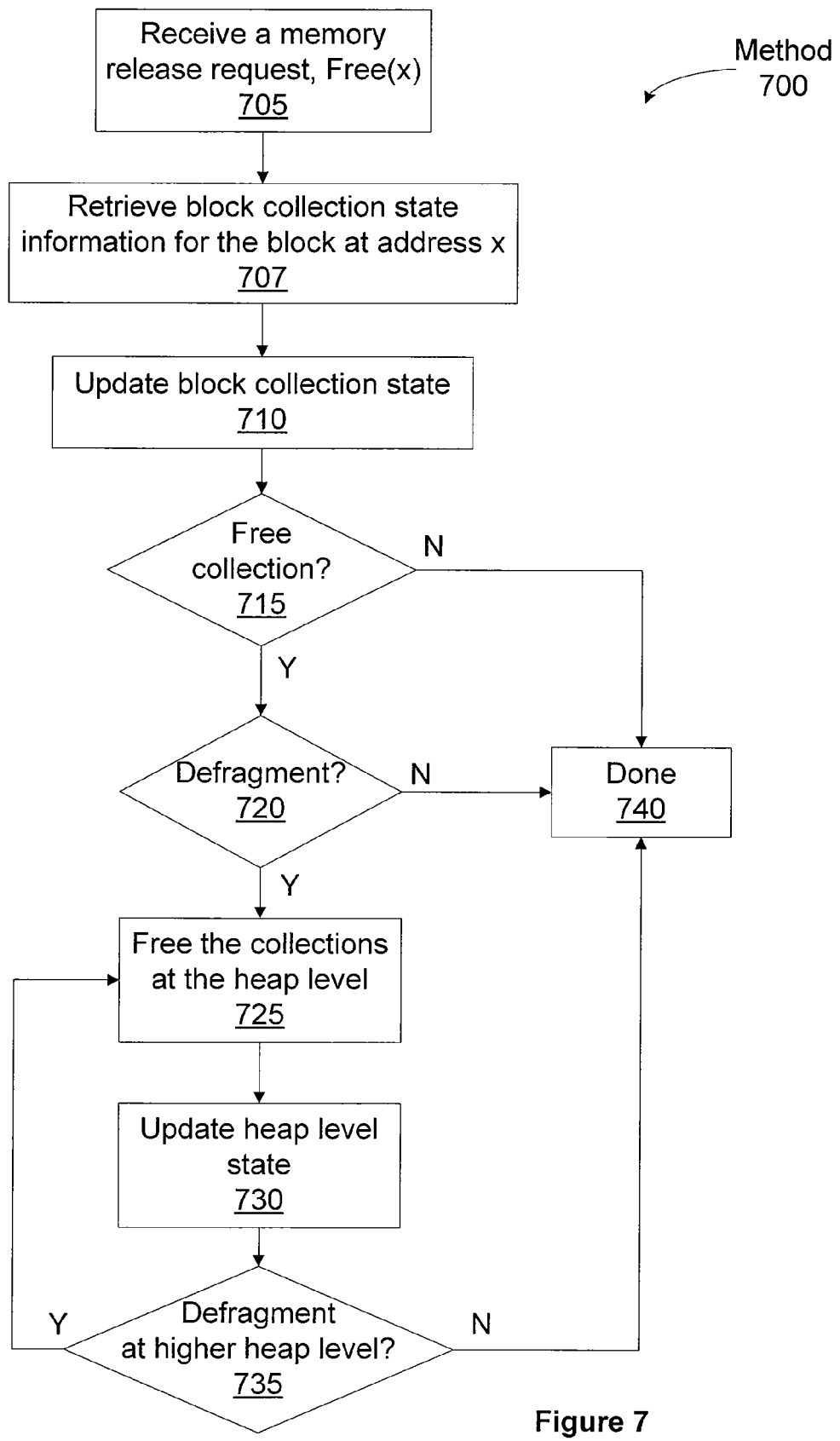
FIG. 7 is a flow diagram of method steps for releasing and defragmenting memory from the nested hierarchical heap, according to one embodiment of the present invention.

FIG. 7 is a flow diagram of method steps 700 for deallocating and defragmenting memory from the nested hierarchical heap 500, according to one embodiment of the present invention. Although the method steps are described in conjunction with the systems of FIGS. 1, 2, 3A, 3B, 3C, and 4, persons skilled in the art will understand that any system configured to perform the method steps, in any order, is within the scope of the invention.

The method steps shown in FIG. 7 are performed by each one of the parallel threads to release memory from the nested hierarchical heap 500. At step 705 a memory release request for a portion of memory is received from a thread, e.g., Free(x), where x is the address of the memory to be released. At step 707, the state for the block corresponding to address x is retrieved. This state contains information about the collection to which the block belongs, as well as the number of contiguous blocks which make up the allocation to be freed. At step 710 a memory deallocator updates the block collection state for the block collection that includes the blocks to be released. Specifically, the memory deallocator updates the availability map to set bits to values of 1, indicating that the corresponding block(s) are now available for allocation.

At step 715 the memory deallocator determines if all of the blocks in the block collection are now available, and, if not, at step 740 the deallocation is done. Otherwise, at step 725 the memory deallocator determines if defragmentation of the heap level should be performed. In one embodiment, defragmentation is performed when all of the blocks at the heap level are available. The availability of blocks may be determined by incrementing a count maintained at each heap level for each allocation and decrementing the count for each deallocation. When the count at a heap level is 0, all of the blocks are available and defragmentation may occur with minimal impact on the allocation and deallocation performance. The count may be stored as state for each heap level.

In another embodiment, defragmentation may be performed based on a timer or when the number of available blocks or block collections at a heap level reaches a threshold value. If, at step 720 the memory deallocator determines that defragmentation should not occur, then at step 740 the release process is done. Otherwise, at step 725 the memory deallocator frees the block collections that include only available blocks at the heap level by updating the block collection state at the immediately higher heap level to indicate that the parent block for each available block collection at the heap level is available. The memory deallocator recursively deallocates blocks by moving up through the hierarchy in a manner similar to how the memory allocator generates block collections. Because each collection at heap level L was generated from a single block at the heap level L+1, a freed block collection at heap level L makes the parent block from which the freed block collection was originally generated available for allocation. The state for the block collection stores a pointer to the parent block.

At step 730 the memory deallocator updates the heap level state to modify the pointer to the first block collection if any block collections remain at the heap level and the previous first block collection was freed. The memory deallocator also updates the pointer to the next block collection in the linked list that is stored in the state for each block collection when two or more block collections remain at the heap level after the defragmentation.

At step 735 the memory deallocator determines if defragmentation should occur at the higher heap level. As previously explained with regard to step 720, defragmentation may be initiated based on a timer, when a threshold value of available blocks is met, or when all of the blocks at the (higher) heap level are available. At step 735, the memory deallocator determines if the immediately higher heap level should be defragmented, and, if not, at step 740 the defragmentation is done. Otherwise, the memory deallocator returns to step 725 to release block collections having only available blocks at the higher heap level.

The nested hierarchical heap structure enables efficient allocation of memory space for one or more threads simultaneously based on the amount of the memory requested and the block size specific to each level of the hierarchy. When blocks are available, the allocation is performed and when blocks are not available, new blocks are generated. The allocation is performed using an atomic operation to ensure that multiple threads may simultaneously access the nested hierarchical heap. A single thread may generate new blocks when they are needed while other threads needing blocks at the same heap level wait. Similarly, a single thread may perform defragmentation to consolidate blocks into higher levels of the heap hierarchy. Although other threads may need to wait while the single thread generates new blocks or performs defragmentation, the generation and defragmentation is performed independently at each level of the heap hierarchy. Access to other levels of the heap hierarchy is not blocked when blocks are generated or cleaned up at one level of the heap hierarchy.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of allocating memory from a nested hierarchical heap, the method comprising:
   receiving a memory allocation request specifying an amount of memory;
   identifying a heap level based on the amount of memory and a block size of a plurality of heap levels of the nested hierarchical heap, wherein each of the plurality of heap levels of the nested hierarchical heap is associated with a different block collection state;
   computing a number of blocks needed to satisfy the memory allocation request;
   determining that the number of blocks is available at the heap level by reading the block collection state associated with the heap level, wherein each bit included in the block collection state is associated with a different block of the heap level and indicates whether the block is available; and
   allocating the number of blocks using an atomic operation.

2. The method of claim 1, further comprising:
   determining that the number of blocks is not available at the heap level; and
   generating a new block collection at the heap level from a first block at an immediately higher heap level of the nested hierarchical heap.

3. The method of claim 2, further comprising, prior to generating the new block collection, setting a flag by a first thread to prevent other threads from generating another new block collection at the heap level.

4. The method of claim 3, further comprising, after generating the new block collection, clearing the flag by the first thread to allow other threads to generate another new block collection at the heap level.

5. The method of claim 1, further comprising:
   receiving a memory free request specifying the amount of memory; and
   releasing the number of blocks at the heap level using another atomic operation.

6. The method of claim 5, further comprising:
   determining that defragmentation should occur; and releasing a parent block from which a block collection including the number of blocks was generated.

7. The method of claim 1, wherein each heap level includes one or more block collections that each include N blocks, and a single block collection at a first heap level of the nested hierarchical heap has a storage capacity of a single block at an immediately higher heap level of the nested hierarchical heap.

8. The method of claim 1, wherein the allocating of the number of blocks comprises executing an atomic compare-and-swap operation.

9. The method of claim 1, wherein each block collection state further includes a status bit configured to lock access to the corresponding heap level during block collection generation and defragmentation of the heap level.

10. A system for allocating memory from a nested hierarchical heap, the system comprising:
   a memory that is configured to store the nested hierarchical heap; and
   a processor that is configured to:
      receive a memory allocation request specifying an amount of memory;
      identify a heap level based on the amount of memory and a block size of a plurality of heap levels of the nested hierarchical heap, wherein each of the plurality of heap levels of the nested hierarchical heap is associated with a different block collection state;
      compute a number of blocks needed to satisfy the memory allocation request;
      determine that the number of blocks is available at the heap level by reading the block collection state associated with the heap level, wherein each bit included in the block collection state is associated with a different block of the heap level and indicates whether the block is available; and
      allocate the number of blocks using an atomic operation.

11. The system of claim 10, wherein the processor is configured to:
   determine that the number of blocks is not available at the heap level; and
   generate a new block collection at the heap level from a first block at an immediately higher heap level of the nested hierarchical heap.

12. A non-transitory computer-readable storage medium storing instructions that, when executed by a processor, cause the processor to allocate memory from a nested hierarchical heap, by performing the steps of:
   receiving a memory allocation request specifying an amount of memory;
   identifying a heap level based on the amount of memory and a block size of a plurality of heap levels of the nested hierarchical heap, wherein each of the plurality of heap levels of the nested hierarchical heap is associated with a different block collection state;
   computing a number of blocks needed to satisfy the memory allocation request;
   determining that the number of blocks is available at the heap level by reading the block collection state associated with the heap level, wherein each bit included in the block collection state is associated with a different block of the heap level and indicates whether the block is available; and
   allocating the number of blocks using an atomic operation.

13. The non-transitory computer-readable storage medium of claim 12, further comprising:
   determining that the number of blocks is not available at the heap level; and
   generating a new block collection at the heap level from a first block at an immediately higher heap level of the nested hierarchical heap.

14. The non-transitory computer-readable storage medium of claim 13, further comprising, prior to generating the new block collection, setting a flag by a first thread to prevent other threads from generating another new block collection at the heap level.

15. The non-transitory computer-readable storage medium of claim 14, further comprising, after generating the new block collection, clearing the flag by the first thread to allow other threads to generate another new block collection at the heap level.

16. The non-transitory computer-readable storage medium of claim 12, further comprising:
   receiving a memory free request specifying the amount of memory; and
   releasing the number of blocks at the heap level using another atomic operation.

17. The non-transitory computer-readable storage medium of claim 16, further comprising:
   determining that defragmentation should occur; and
   releasing a parent block from which a block collection including the number of blocks was generated.

18. The non-transitory computer-readable storage medium of claim 12, wherein each heap level includes one or more block collections that each include N blocks, and a single block collection at a first heap level of the nested hierarchical heap has a storage capacity of a single block at an immediately higher heap level of the nested hierarchical heap.

19. The non-transitory computer-readable storage medium of claim 12, wherein the allocating of the number of blocks comprises executing an atomic compare-and-swap operation.

* * * * *